United States Patent [19]

Wu

[11] Patent Number: 5,591,095
[45] Date of Patent: Jan. 7, 1997

[54] CHAIN FOR A BICYCLE WITH DERAILLEUR

[76] Inventor: Chia-long Wu, No 734, Chungshan Rd., Kueiren Hsiang, Tainan Hsien, Taiwan

[21] Appl. No.: 595,972

[22] Filed: Feb. 6, 1996

[51] Int. Cl.$^6$ ............................................. F16G 13/02
[52] U.S. Cl. ............................................. 474/231
[58] Field of Search ............................ 474/226–231

[56] References Cited

U.S. PATENT DOCUMENTS 4,411,131  10/1983  Ohnishi et al. ............... 474/228 X
5,437,577   8/1995  Wu ................................ 474/218

FOREIGN PATENT DOCUMENTS 47-28816   7/1972   Japan .

Primary Examiner—Roger J. Schoeppel
Attorney, Agent, or Firm—Hamilton, Brook, Smith & Reynolds, P.C.

[57] ABSTRACT

A chain includes a plurality of pairs of alternate inside links and first and second outside links, rollers and pins, wherein second ends of the first outside links and first ends of the second outside links each have a diameter greater than that of first ends of the first outside links and second ends of the second outside links, and each of the ends of the respective inside links has a diameter slightly smaller than that of the first end of the first outside link or the second end of the second outside link.

3 Claims, 4 Drawing Sheets

CHAIN FOR A BICYCLE WITH DERAILLEUR

FIELD OF THE INVENTION

The present invention relates to an improved chain for a derailleur-type bicycle to quickly guide the chain of the bicycle into engagement with the gears.

DESCRIPTION OF THE RELATED ART

It is well known to provide front and/or rear derailleur on bicycles to provide different gear ratios which is useful when cycling on roads having different slopes, such as uphill, downhill, and flat road surfaces. Although a wide variety of chains have heretofore provided for deraillleaur-type bicycles, it is found that they cannot satisfactorily fill the need of quickly shifting gear and when upshifting, the chain might disturb the tooth of the sprocket wheel, and thus the chain of the bicycle is not guided into engagement with the gears regularly.

The present invention provides an improved chain to mitigate and/or obviate the aforementioned problems.

SUMMARY OF THE INVENTION

A chain includes a plurality of pairs of alternate inside links and outside links, rollers and pins, each inside link being substantially dumbbell-shaped and including first and second ends each of which has a regular curvature and both of which are of the same diameter, each pair of outside links including a first outside link and a second outside link, both the first outside link and the second outside link being substantially dumbbell-shaped and having first and second ends each of which has a regular curvature; a roller disposed between each end of each of said pairs of inside links; each end of said pairs of inside and outside links having a pin hole defined therethrough; a pin disposed in each of said pin holes and rotatably connecting corresponding ends of alternating pairs of inside and outside links.

The present invention is characterized in that:

each of the second ends of the first outside links and the first ends of the second outside links having a diameter greater than that of the first ends of the first outside links and the second ends of the second outside links.

Whereby the ends of the first outside link and the second outside link connected by the same pin have the different diameters.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
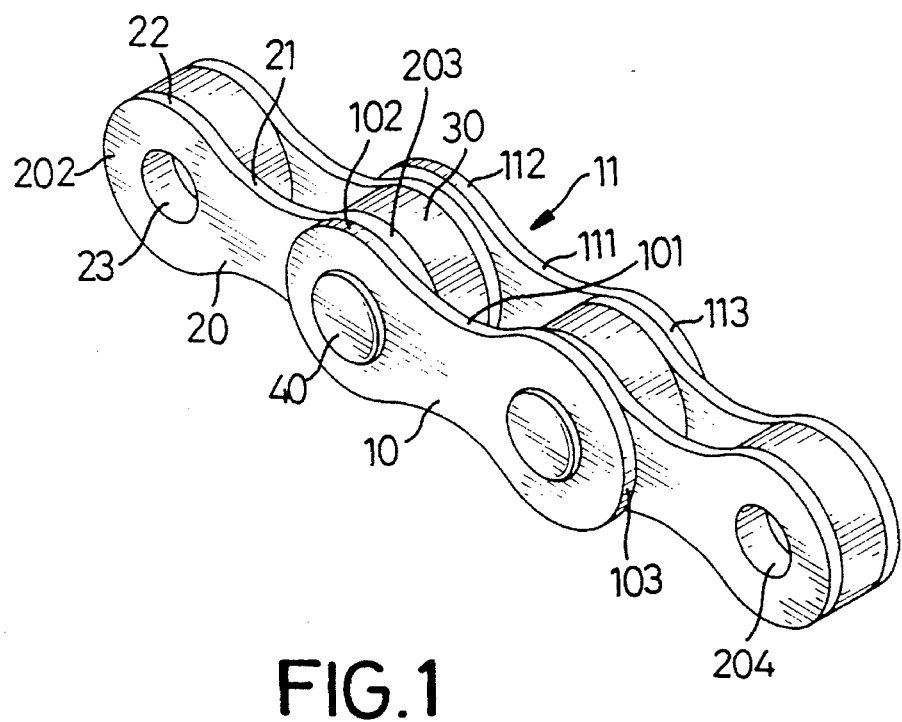
FIG. 1 is a perspective view illustrating a portion of a chain in accordance with the present invention.
Figure 2:
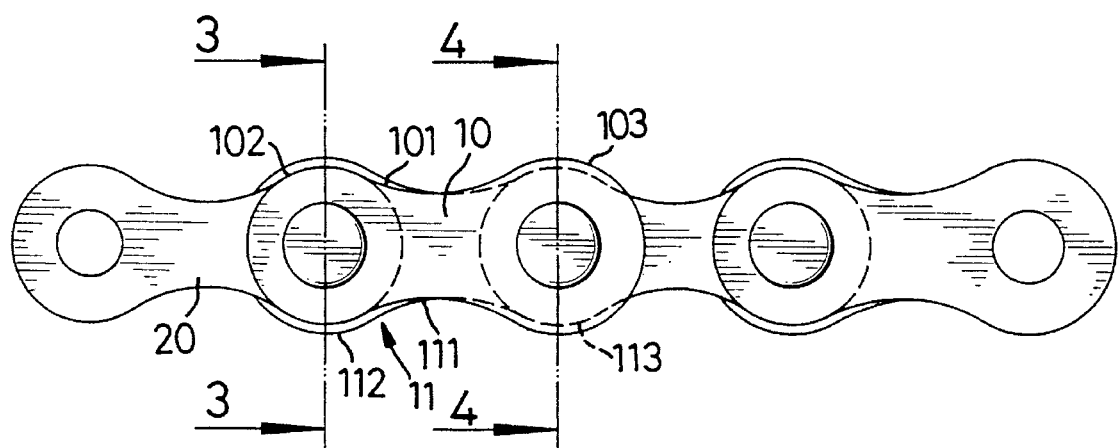
FIG. 2 is a plan view of the chain in accordance with the present invention.

Referring to the drawings and initially to FIGS. 1 and 2, a chain generally includes a plurality of pairs of alternate outside links each including a first outside link 10 and a second outside link 11 and a plurality of pairs of alternate inside links 20.

Figure 3:
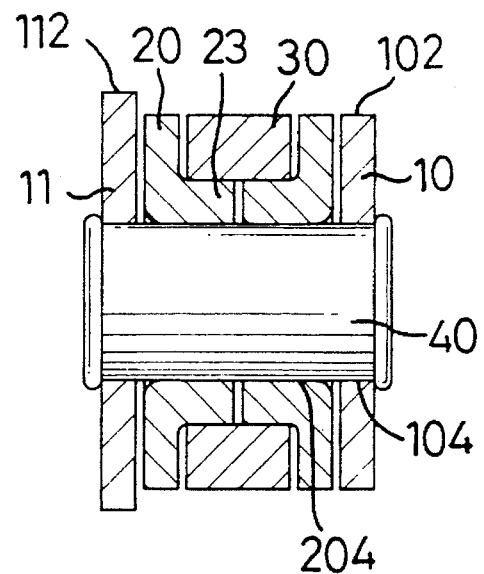
FIG. 3 is a cross-sectional view taken along line 3—3 on FIG. 2.

Each first outside link 10 is substantially dumbbell-shaped and includes first and second ends 102 and 103 each of which has a regular curvature. The first outside link 10 has a first pin hole 104 (as shown in FIG. 3) transversely and centrally defined through each of the first and second ends 102, 103. A transition section 101 with a concave periphery is integrally formed between the first and second ends 102, 103. The second outside link 11 has a structure the same as the first outside link 10 (the reference numerals indicating like parts begin with "11" instead of "10") and is not described in further detail here.

Each inside link 20 is also substantially dumbbell-shaped and includes first and second ends 202, 203 each of which has a regular curvature 22 and both of which are of the same diameter. A transition section 21 with a concave periphery is formed between the first and second ends 202, 203 of the inside link 20. Each inside link 20 further includes a pair of bosses 23 projecting from one side thereof, and a second pin hole 204 is transversely and centrally defined through each first and second end 202, 203 of the inside link 20. Further, a roller 30 is mounted around two aligned bosses 23 of each pair of assembled inside links 20.

Figure 4:
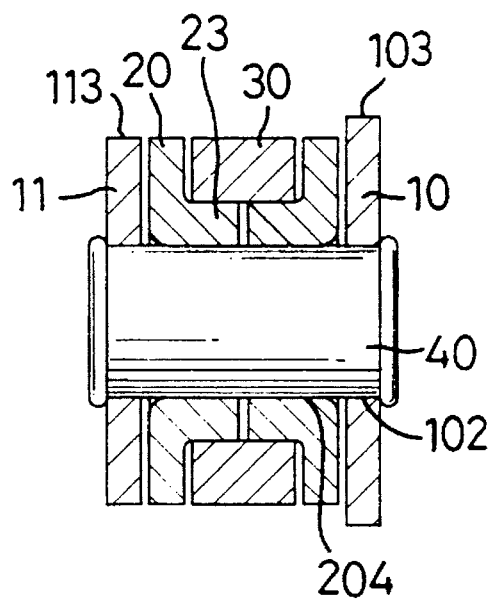
FIG. 4 is a cross-sectional view taken along line 4—4 on FIG. 2.

Referring now to FIGS. 3 and 4, the second end 103 of the first outside link 10 and the first end 112 of the second outside link 11 have a diameter greater than that of the first ends 102 of the first outside links 10 and the second ends 113 of the second outside links 11, while the first end 102 of the first outside link 10 and the second end 113 of the second outside link 11 have a diameter slightly greater than or the same as that of the first end of the inside link 20.

When assembling, a pin 40 with a diameter sized to have an interference fit with a periphery defining the first pin hole 104 extends through one of the pin holes 104 of the second outside link 11 and one of the pin holes 204 in each of the respective pair of inside links 20 and then through the corresponding pin hole 104 of the first outside link 10, whereby the first end 102 of the first outside link 10 and the first end 112 of the second outside link 11 which have different diameters are connected to each other by the pin 40.

Figure 5:
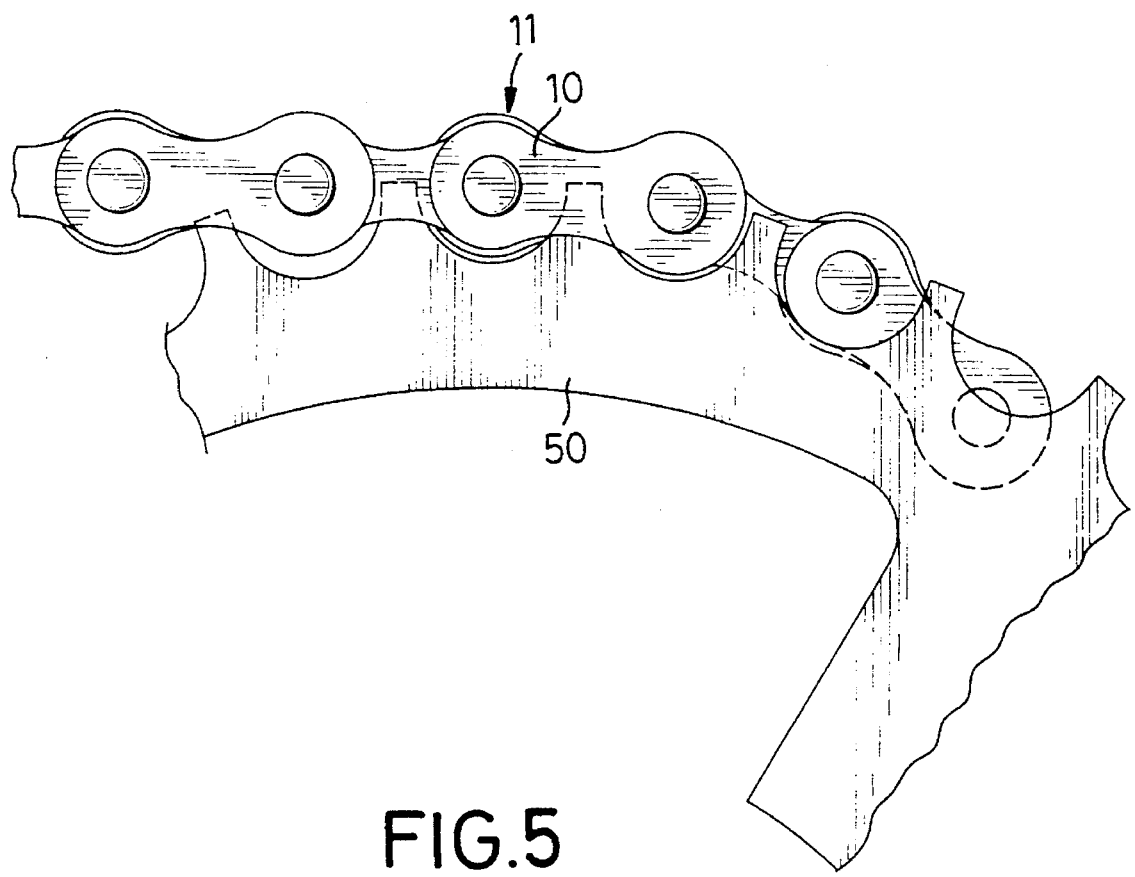
FIG. 5 is a partial schematic view illustrating a gear shifting condition of the chain.
Figure 6:
FIG. 6 is a top plan view illustrating the chain installed between a front sprocket wheel and a rear sprocket wheel.

Referring now to FIGS. 5 and 6, the first outside link 10 is provided for a front sprocket wheel 50 and the second outside link 11 is provided for a rear sprocket wheel 60. In shifting operation of the bicycle drive chain the chain is lifted from a auxiliary tooth 51 of the sprocket wheel 50, when upshifting, the first end 102 of the outside link of chain is shifted to an end of gear tooth 52 of the front sprocket wheel 50, then causing a periphery of the first end 102 to be located at the same plane of the gear tooth 52 and whereby minimizing a gap between the chain and the gear tooth 52 and the tooth 52 contacts the first end 102 of the outside link 10 and engages with the chain, the chain is in reliable engagement exactly with the sprocket wheel 50. Because the first end 102 of the outside link 10 has relatively small diameter, when upshifting, the first end 102 does not disturb the gear tooth 52. When upshifting of the rear sprocket wheel, the second end 113 of the second outside link 11 can be used in the manner described in the preceding paragraph.

Although the invention has been explained in relation to its preferred embodiment, it is to be understood that many other possible modifications and variations can be made without departing from the spirit and scope of the invention as hereinafter claimed.

What the invention claimed is:

1. A bicycle drive chain comprising:

a plurality of pairs of alternate inside links and outside links, rollers and pins, each inside link being substantially dumbbell-shaped and including first and second ends each of which has a regular curvature and both of which are of the same diameter, each pair of outside links including a first outside link and a second outside link, both the first outside link and the second outside link being substantially dumbbell-shaped and having first and second ends each of which has a regular curvature; a roller disposed between each end of each of said pairs of inside links; each end of said pairs of inside and outside links having a pin hole defined therethrough; a pin disposed in each of said pin holes and rotatably connecting corresponding ends of alternating pairs of inside and outside links;

each of the second ends of the first outside links and the first ends of the second outside links have a diameter greater than that of the first ends of the first outside links and the second ends of the second outside links; and the ends of the first outside link and the second outside link connected by the same pin have different diameters.

2. The bicycle drive chain of claim 1, wherein each of the ends of the respective inside links has a diameter the same as that of the first end of the first outside link or the second end of the second outside link.

3. The bicycle drive chain of claim 1, wherein each of the ends of the respective inside links has a diameter slightly smaller than that of the first end of the first outside link or the second end of the second outside link.

* * * * *